United States Patent
Ouellette

(12) 
(10) Patent No.: US 6,414,764 B1
(45) Date of Patent: Jul. 2, 2002

(54) RING INTERFEROMETER CONFIGURATION FOR WRITING GRATINGS

(76) Inventor: Francois Ouellette, 275 Kesmark, Dollard- des- Ormeaux, Quebec (CA), H9B 3J1

( * ) Notice: Subject to any disclaimer, the term of this patent is extended or adjusted under 35 U.S.C. 154(b) by 0 days.

(21) Appl. No.: 09/135,097

(22) Filed: Aug. 17, 1998

(Under 37 CFR 1.47)

Related U.S. Application Data

(63) Continuation of application No. 09/068,268, filed as application No. PCT/AU96/00782 on Dec. 2, 1996.

(51) Int. Cl.[7] .............................. G03H 1/04; G03H 1/00; G02B 5/18; G03B 6/34
(52) U.S. Cl. ........................... 359/35; 359/34; 359/571; 359/569; 359/30; 385/37; 430/1
(58) Field of Search ............................... 359/8, 34, 35, 359/30, 566, 570, 569, 562, 571; 385/37; 430/1

(56) References Cited

U.S. PATENT DOCUMENTS

| 5,066,133 A | * | 11/1991 | Brienza ...................... 359/570 |
| 5,552,882 A | * | 9/1996 | Lyons et al. .................. 359/34 |
| 5,712,715 A | * | 1/1998 | Erdogan et al. ............... 359/8 |
| 5,818,988 A | * | 10/1998 | Modavis ....................... 385/37 |

* cited by examiner

*Primary Examiner*—Audrey Chang
(74) *Attorney, Agent, or Firm*—Ladas & Parry

(57) ABSTRACT

A method and apparatus is disclosed for creating a structure, such as a grating (45) in a photosensitive material (40). The method and apparatus relies upon creating at least two coherent beams of light (33, 38) and reflecting them, in a counter propagating manner, around a series of reflective elements (35, 37) along substantially equivalent paths so that the coherent beams interfere at a structure staging area (45). The structure staging area can then be utilized to create grating structures or the like having improved qualities.

24 Claims, 5 Drawing Sheets

US 6,414,764 B1

RING INTERFEROMETER CONFIGURATION FOR WRITING GRATINGS

This is a continuation of application Ser. No. 09/068,268 filed May 5, 1998, now abandoned which is a §371 national application of PCT/AU96/00782 filed Dec. 2, 1996.

FIELD OF THE INVENTION

The present invention relates to the creation of patterns on photosensitive optical materials, such as waveguides.like optical fibres, by placing the materials in the interference pattern generated by the intersection of at least two beams of light, preferably ultra violet light. The period of the grating or interference pattern being determined by the angle between and nature of the intersecting beams.

BACKGROUND OF THE INVENTION

Referring now to FIG. 1, there is illustrated a first known set up 1 for writing gratings 2 on an optical waveguide 3 which can comprise an optical fibre. This setup 1 includes an ultra violet laser 4 which generates a UV beam 5 which is split by a beam splitter 6 into two coherent beams 7, 8. The beam splitter 6 can comprise a semi transparent mirror or a phase mask. The UV beams 7, 8 are reflected by mirrors 10,11 which reflect the coherent beams 12, 13. The two beams 12, 13 interfere with one another so as to form an interference pattern which is projected onto photosensitive optical fibre 3 so as to form grating 2.

As the photosensitive fibre 3 is only affected by the bright fringes of the interference pattern, this pattern is transformed into a permanent refractive index grating. The fibre 3 is photosensitive in that the physical properties of the fibre are modified permanently under the action of the UV light. In the case of optical fibre, it is the refractive index which is modified, but the present invention is not limited thereto and extends to other properties such as absorption, density, chemical composition or volume.

In the arrangement of FIG. 1, it is further known to add a further mirror in one of the paths of beams 7, 8 so as to invert the profile of one of the beams. This way, the two beam profiles 12, 13 will be identical at the intersection point 2, instead of one beam reversed with respect to the other when only two folding mirrors 10, 11 are used. It is further known to utilise a three mirror arrangement to scan a narrow beam along the whole of the aperture defined by the beam splitter 6 and folding mirrors 10, 11 so as to produce an extended grating 2.

Referring now to FIG. 2, there is illustrated a second known arrangement 20 for writing gratings on an optical fibre e.g. 21. In this arrangement, the optical fibre 21 is placed directly behind a phase or amplitude mask 22. A UV beam 23 is diffracted by the phase mask 22 to produce diffraction orders e.g. 24, 25. The diffraction orders 24, 25 interfere with one another to produce an interference pattern 26 directly behind the phase mask 22 which is where the photosensitive optical fibre 21 is placed. In this configuration 20, the grating period will be determined by the period of the phase mask 22. The Bragg wavelength of a grating in optical fibre 21 can only be changed by, for example, stretching the grating during writing.

As noted previously, it is possible to use the phase mask 22 as a beam splitter giving many diffraction orders including orders 24, 25. Therefore, the phase mask 22 can also be utilised as beam splitter 6 in the arrangement of FIG. 1, by altering the orientation of beam splitter 6 and UV laser source 4.

In another known arrangement, due to Kashyap, the two mirrors 10, 11 of FIG. 1 are replaced by a solid silica block such that the UV beams are totally internally reflected on the side of the block. When utilising this configuration, all orders of diffraction other than the two desired to be utilised for the interference pattern can be blocked. This configuration is also mechanically more stable, but does not allow easy tuning of the angle between the interfering beams.

In all the aforementioned interferometric configurations, whether a beam splitter or a phase mask is utilised to split the beam, the two resulting beams 7, 8 follow different physical paths before intersecting to form grating 2. Therefore, a general problem with the arrangement of FIG. 1 is that any slight mechanical perturbation in mirrors 10, 11 will change the phase of the interference pattern during the exposure generating grating 2, resulting in a loss of contrast and/or a total "washing out" of the interference pattern. It has therefore been found that great care must be taken in stabilising the arrangement 1 from any vibrations, such as those caused from air currents or movement and, such a need for stabilisation severely limits the utility of the arrangement of FIG. 1.

SUMMARY OF THE INVENTION

It is therefore an object of the present invention to provide for an improved method and apparatus of writing structures such as gratings on photosensitive optical waveguides.

In a preferred aspect of the present invention, there is provided a method for creating a structure, such as a grating, in a light sensitive optical material, such as an optical fibre. The method comprises the steps of:

(1) First creating two coherent beams of light, preferably being created by means of passing a single coherent beam through a diffraction grating.

(2) Counter propagating the two beams around an optical circuit which comprises a plurality of reflective elements so that the two beams interfere at a predetermined position.

(3) Positioning the light sensitive optical waveguide at the predetermined position so as to produce the desired structure in the optical waveguide.

Although the present invention is useful for creating many different types of structures, it is most useful in creating grating structures.

The coherent beams can be created utilising a phase mask, diffraction grating or a partially transparent mirror. The optical material can comprise an optical waveguide or optical fibre. The coherent beams can be swept along the phase mask in order to create an extended structure in the photosensitive optical material. Additionally, the refractive elements can be rotated or moved to produce different structures such as chirped gratings or apodized gratings. The optical material can be placed at various angles so as to produce blazed gratings etc.

In alternative embodiments, there will be illustrated methods for creating extended grating structures, chirped gratings, apodized gratings etc. The optical material can be placed at various angles so as to produce different effects such as apodized gratings.

In accordance with a second aspect of the present invention there is provided an apparatus for creating a structure in a photosensitive material comprising:

coherent light production means for producing at least two coherent beams of light;

a plurality of reflective elements for reflecting said coherent beams along counter propagating, substantially equivalent paths so that said coherent beams interfere at a structure staging area; and structure staging means for mounting said photosensitive material in said structure staging area.

Preferably, the coherent light production means further comprises a coherent light input means for inputting coherent light into said coherent light production means and wherein said coherent light input means can be scanned along said coherent light production means so as to produce a corresponding extended structure in said photosensitive material.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF THE PREFERRED AND OTHER EMBODIMENTS

Figure 1:
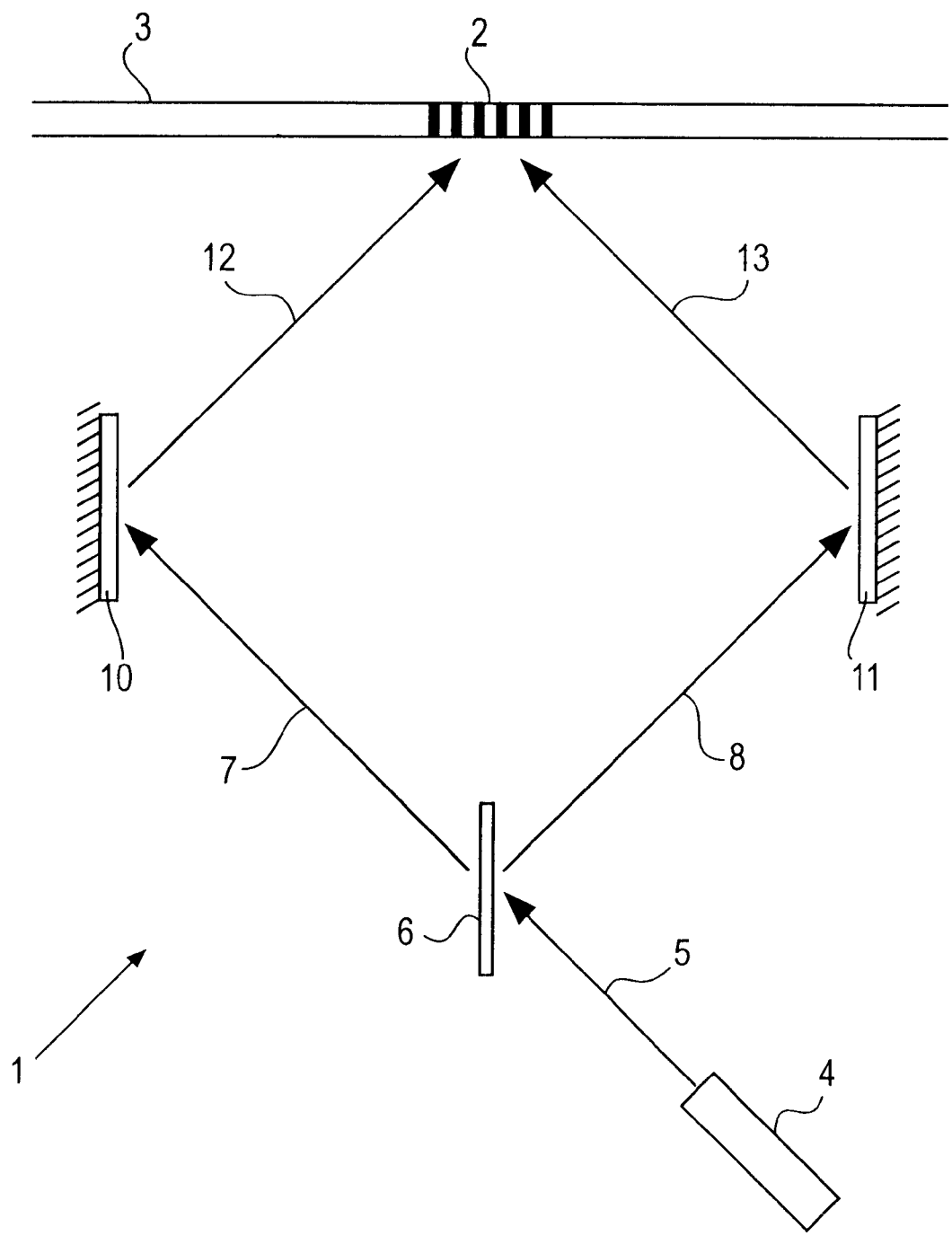
FIG. 1 illustrates the first method for creating gratings in accordance with the prior art.
Figure 2:
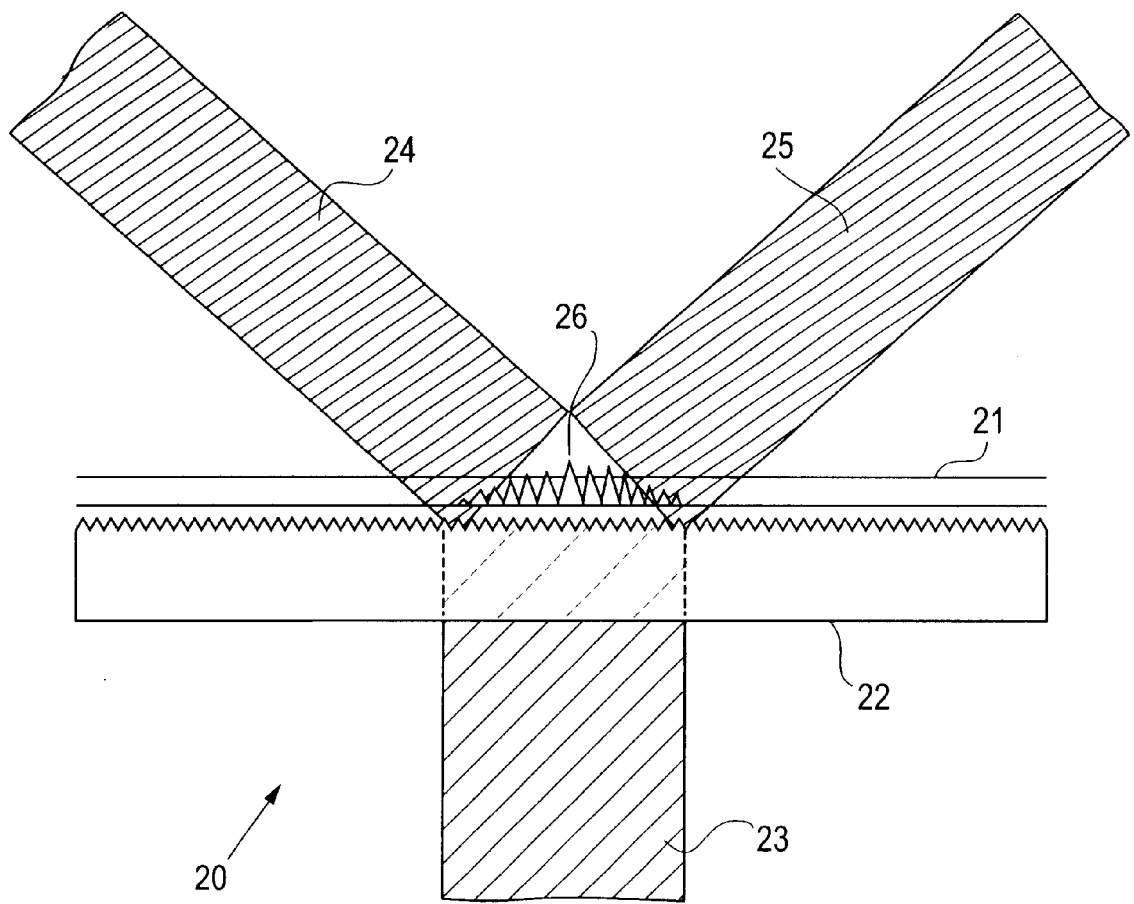
FIG. 2 illustrates a second method for creating gratings in accordance with the prior art.
Figure 3:
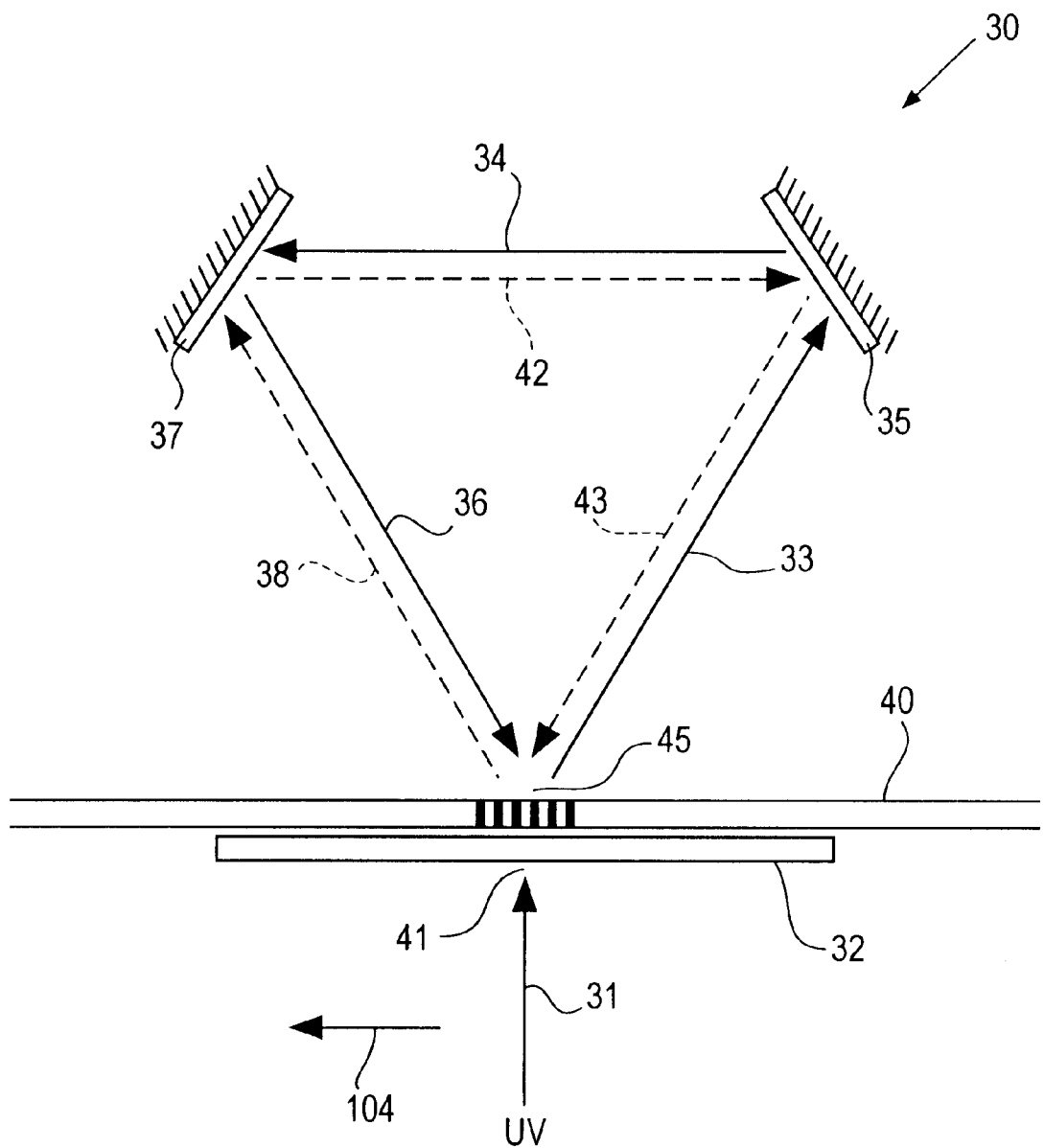
FIG. 3 is a schematic view of the arrangement of the preferred embodiment.

Referring now to FIG. 3, there is illustrated 30, the arrangement of the preferred embodiment. In this arrangement, an ultra violet laser beam 31 impinges upon a phase or amplitude mask 32 which acts as a diffractive element producing a number of diffractive orders e.g. 33, 38 which have directions symmetric around the axis defined by beam 31. In FIG. 3, only the first diffraction order (+1, −1) is illustrated. Further diffraction orders which may be produced can be blocked, forming no further part of the arrangement 30. A first diffracted order beam 33 is first reflected 34 by mirror 35 before being again reflected 36 by mirror 37. The reflected beam 36 then impinges upon photosensitive optical waveguide 40. As will be better illustrated in FIG. 4 and described below, the optical waveguide 40 is displaced in the vertical direction with respect to the horizontal plane of rays 33, 34, 36 from the point 41 at which the UV beam 31 impinges upon the phase mask 32.

The second first order diffraction beam 38 traverses an opposite path in that it is firstly reflected 42 by mirror 37 and secondly reflected 43 by mirror 35. The two mirrors 35, 37 can be adjusted such that the two beams 36, 43 impinge upon the same point of the optical fibre waveguide 40 and to thereby produce a grating 45 by means of an interference effect. Alternatively, the optical fibre waveguide can be moved to the position of overlap of the interfering beams. The correct positioning of fibre 40 and the angle of mirrors 35,37 can be determined by first utilising a visible light source and aligning instruments, however, account must be taken for the fact that the visible light source will be diffracted at a different angle from a UV light source.

As the two contra travelling beams travel over substantially the same optical pathway but in opposite directions, any movement or vibration of one of the mirrors 35, 37 or perturbation of the optical path will effect both beams in substantially the same manner, the result being that the relative phase of the two interfering beams is maintained. Therefore, the interference pattern remains substantially stable and effects, which would otherwise "wash out" the grating, do not occur.

Figure 4:
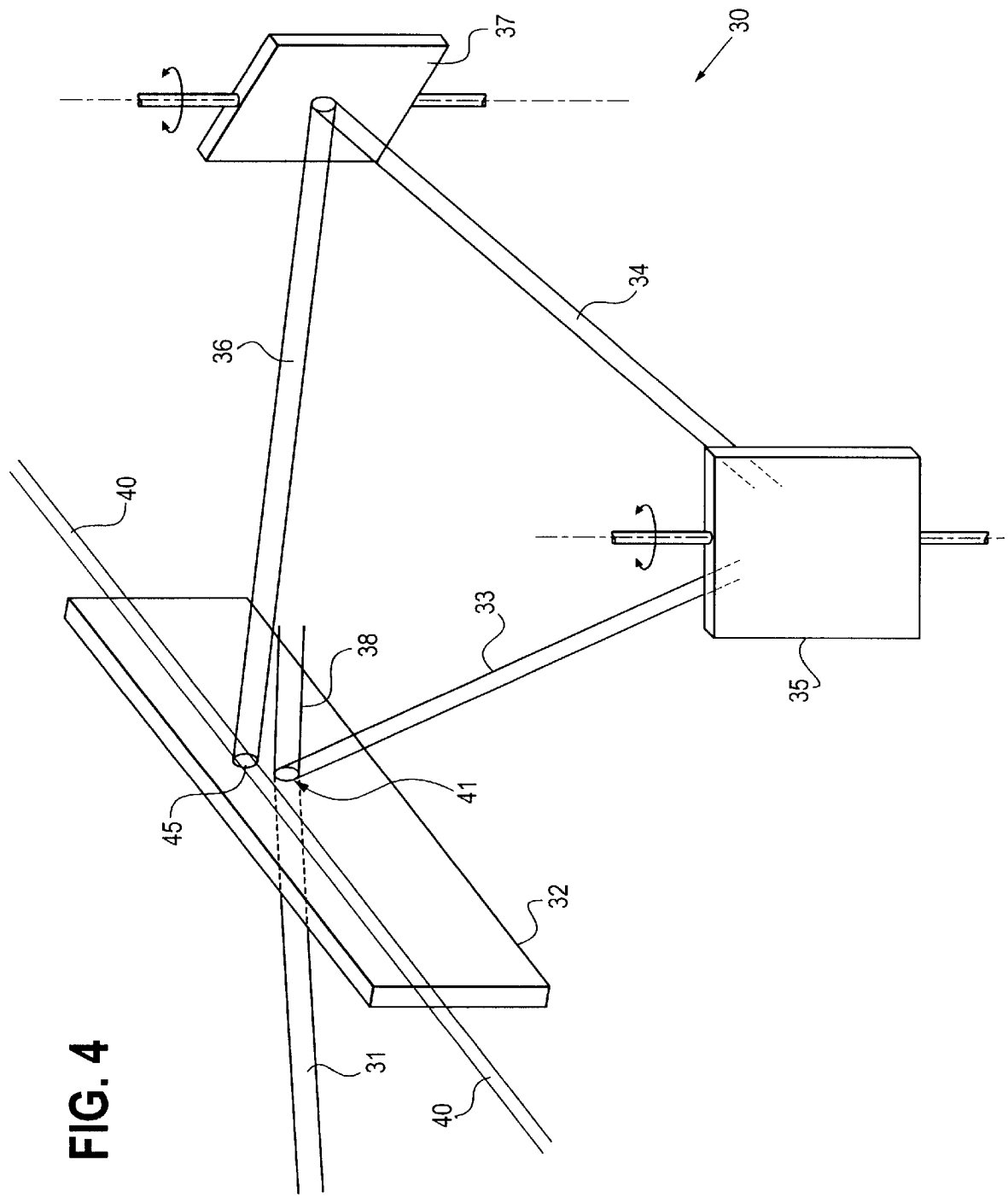
FIG. 4 illustrates a perspective view of the arrangement of FIG. 3.

Turning now to FIG. 4, there is illustrated a perspective view of the arrangement of FIG. 3. The UV beam 31 strikes the phase mask 32 to produce diffracted beams 33, 38. Only the subsequent path of the diffracted beam 33 is illustrated. This beam is reflected by mirror 35 and mirror 37 to form beam 36 which impinges upon the fibre 40 at a point vertically above the path of UV beam 31. The path of beam 38 being symmetrically similar.

Figure 5:
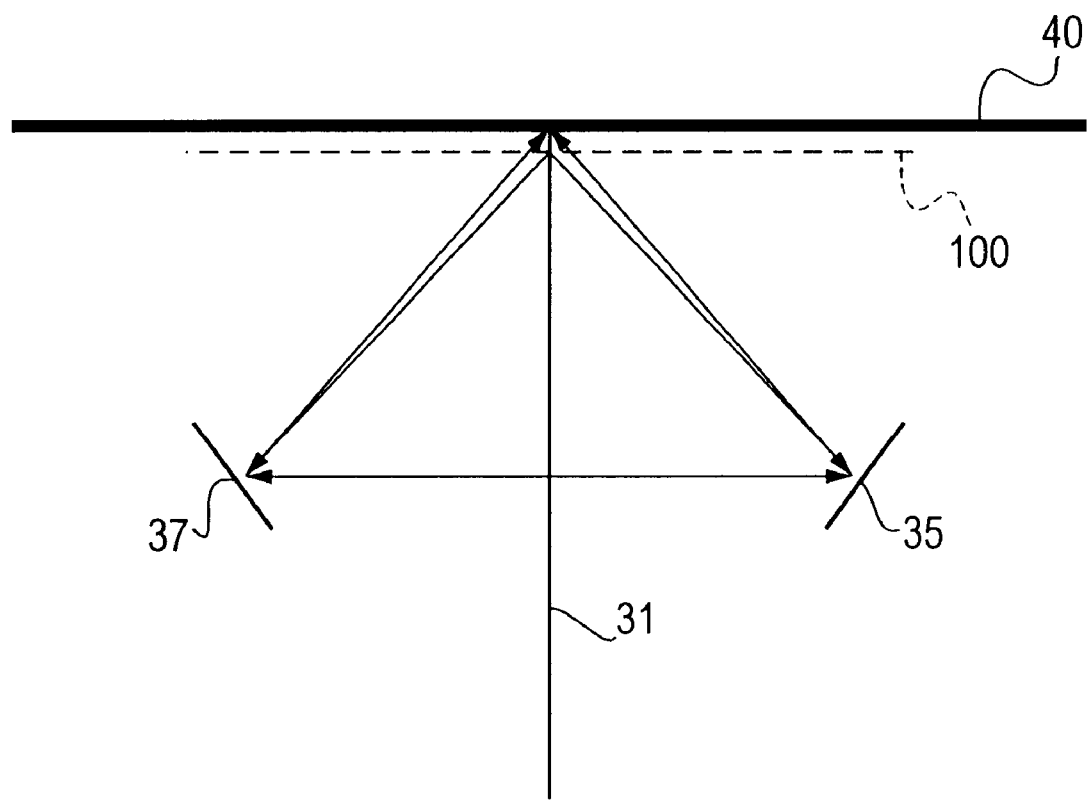
FIG. 5 shows a variation of the embodiment of FIG. 3.

In addition to the preferred arrangement 30, a number of variations are possible. For example, a reflective diffraction grating 100 (see FIG. 5) could be used in place of phase mask 32. Different beam orders could be utilised for reflection. The degree of the small tilt in the vertical direction can be varied. Preferably, the optical fibre 40 is placed at a vertical position as close as possible to the vertical location of UV beam 31.

The waveguide 40 can also be placed at a certain distance in front or at the back of the diffraction element 32 and the angle of the reflecting mirrors 35, 37 adjusted accordingly to maximise the overlap of the intersecting beams on the waveguide 40. This has the effect of providing a tunable grating period, which will be dependent upon the angle of intersecting beams 36, 43.

Further, in alternative arrangements, more than two mirrors 35, 37 could be utilised provided the two beams travel along substantially the same path in opposite directions. Preferably, when a diffraction grating is not used, the number of mirrors is even as this will allow for a spatial correlation of the two beam profiles.

It will be evident that the arrangement of the preferred embodiment has a number of significant advantages. These include:

(1) The arrangement 30 ensures an intrinsic stability, as any movement in a mirror 35, 37 will effect both beams, and the resulting fringe shift of the interference pattern will be minimised. Thus no special care is needed to ensure the mechanical stability of the arrangement 30.

(2) If any unwanted diffraction beams can be blocked, and provided the diffraction beams utilised have equal intensities, the beams interfering on the optical waveguide 40 will also have equal intensities having been reflected by the same mirrors. Thus, the grating will have a high contrast when the waveguide is placed in the region of maximum overlap of the intersecting beams 36, 43.

(3) The grating period can be tuned by adjusting the angle of the reflecting mirrors 35, 37 and therefore adjusting the intersection point of beams 36, 43. As one changes the angle of the mirrors 35, 37, the region of maximum overlap of the intersecting beams 36, 43 may move towards or away from the phase mask 32. Therefore, the position of waveguide 40 should be accordingly adjusted to obtain maximum fringe contrast. It has been found that, for small angle changes, the intrinsic insensitivity of the interference pattern is maintained. Mathematical analysis shows that the sensitivity to movement of one mirror appears only to introduce a second order error correction term.

(4) One advantage of the preferred embodiment is that the two intersecting beams are not reversed spatially with respect to one another. Therefore, a high degree of spatial coherence of the beams is not required, since the same parts of the beam interfere with themselves and not with another part which is the symmetrically opposite part of the beam, as when the prior art methods are utilised. As a result, in a refinement of the preferred embodiment, a narrow beam 31 can be used to write a long grating by scanning along the phase mask 32, as indicated by arrow 104 in FIG. 3. A degree of temporal coherence is however required for longer gratings, where this is a path difference between the beams.

(5) In an alternative embodiment, the grating period can be changed dynamically while scanning a narrow beam by varying the angle of mirrors 35, 37. This can be utilised to give a "chirp" to the grating. i.e. a variation of period along its length. For small chirps, the effect on fringe contrast is minimal. On the other hand, since the fringe contrast depends on the overlap of beams 36, 43 on the optical fibre 40, and this overlap depends on the angular adjustment of mirrors 35, 37, this can be used to advantage to modulate both the period and the fringe contrast simultaneously, thereby obtaining an apodized grating reflection spectrum.

(6) By placing the optical waveguide at an angle with respect to the interference pattern, the resulting grating can be "blazed" in that the grating fringes can be created having an angle with respect to a plane transverse to the waveguide.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A method for creating a structure in a photosensitive material comprising the steps of:
   creating two coherent beams of light;
   counter propagating the two beams around a plurality of reflective elements so that they interfere at a predetermined position;
   positioning said photosensitive material at said predetermined position so as to produce said structure in a predetermined portion of said photosensitive material.

2. A method as claimed in claim 1 wherein said structure is a grating structure.

3. A method as claimed in any preceding claim wherein said step of creating two coherent beams of light comprises passing a single coherent beam of light through a phase mask so as to produce two diffracted coherent beams of light.

4. A method as claimed in claim 3 wherein said single coherent beam of light is scanned along said phase mask so as to produce an extended structure in said photosensitive material.

5. A method as claimed in claim 4, wherein said interference at a predetermined position moves so as to maintain a predetermined spatial relationship to said single coherent beam.

6. A method as claimed in claim 1 or claim 2 wherein said step of creating two coherent beams of light comprises reflection of a single coherent beam in a diffraction grating.

7. A method as claimed in claim 6, wherein said single coherent beam of light is scanned along said diffraction grating so as to produce an extended structure in said photosensitive material.

8. A method as claimed in claim 1 wherein the number of reflective elements in a multiple of two.

9. A method as claimed in claim 1 wherein said photosensitive material comprises a photosensitive optical waveguide.

10. A method as claimed in claim 9 wherein said optical waveguide is an optical fiber.

11. A method as claimed in claim 1 wherein at least one of said reflective elements undergoes rotational or spatial movement in producing said structure.

12. A method as claimed in claim 11 wherein said structure is a chirped grating.

13. A method as claimed in claim 12 wherein the structure is placed in the plane of the interfering beams, substantially perpendicular to a bisector of said interfering beams.

14. A method as claimed in claim 12 wherein the structure is placed in the plane of said interfering beams at a non-perpendicular angle to a bisector of said interfering beams.

15. A method as claimed in claim 1 or 12 wherein the photosensitive material is substantially aligned with the plane of the two interfering beams and non-perpendicular to a bisector of said beams.

16. A method as claimed in claim 15 wherein said grating is a blazed grating.

17. A method as claimed in claim 1 or 12 wherein the photosensitive material is rotated with respect to the plane of the two interfering beams.

18. A method as claimed in claim 1 wherein said structure is an apodized grating.

19. An apparatus for creating a structure in a photosensitive material comprising:
   coherent light production means for producing at least two coherent beams of light;
   a plurality of reflective elements for counter propagating said two coherent beams along said reflection elements, so that said coherent beams interfere at a structure staging area; and
   structure staging means for mounting said photosensitive material in said structure staging area.

20. An apparatus as claimed in claim 19 wherein said structure is a grating structure.

21. An apparatus as claimed in claim 19 wherein the number of reflective elements is even.

22. An apparatus as claimed in claim 19 wherein said structure is a photosensitive waveguide.

23. An apparatus as claimed in claim 19 wherein said coherent light production means further comprises a coherent light input means for inputting coherent light into said coherent light production means and wherein said coherent light input means is arranged to be scanned along said coherent light production means so as to produce a corresponding extended structure in said photosensitive material.

24. An apparatus as claimed in claim 23, wherein said interference in said structure staging area is translated with said scanning of said coherent light input means so that the spatial relationship between the coherent light input means and said structure staging area is maintained.

* * * * *